Aug. 5, 1952     C. H. DAY     2,605,915
TRAILER TRUCK FOR HAY AND STRAW BALERS

Filed Aug. 5, 1947     4 Sheets—Sheet 1

Inventor
CHARLES H. DAY
By McMorrow, Berman and Davidson
Attorneys

Aug. 5, 1952 — C. H. DAY — 2,605,915
TRAILER TRUCK FOR HAY AND STRAW BALERS
Filed Aug. 5, 1947 — 4 Sheets-Sheet 2

Inventor
CHARLES H. DAY
By McNorray, Berman and Davidson
Attorneys

Aug. 5, 1952 — C. H. DAY — 2,605,915
TRAILER TRUCK FOR HAY AND STRAW BALERS
Filed Aug. 5, 1947 — 4 Sheets-Sheet 3

Inventor
CHARLES H. DAY
By McMorrow, Berman and Davidson
Attorneys

Aug. 5, 1952 — C. H. DAY — 2,605,915
TRAILER TRUCK FOR HAY AND STRAW BALERS
Filed Aug. 5, 1947 — 4 Sheets-Sheet 4
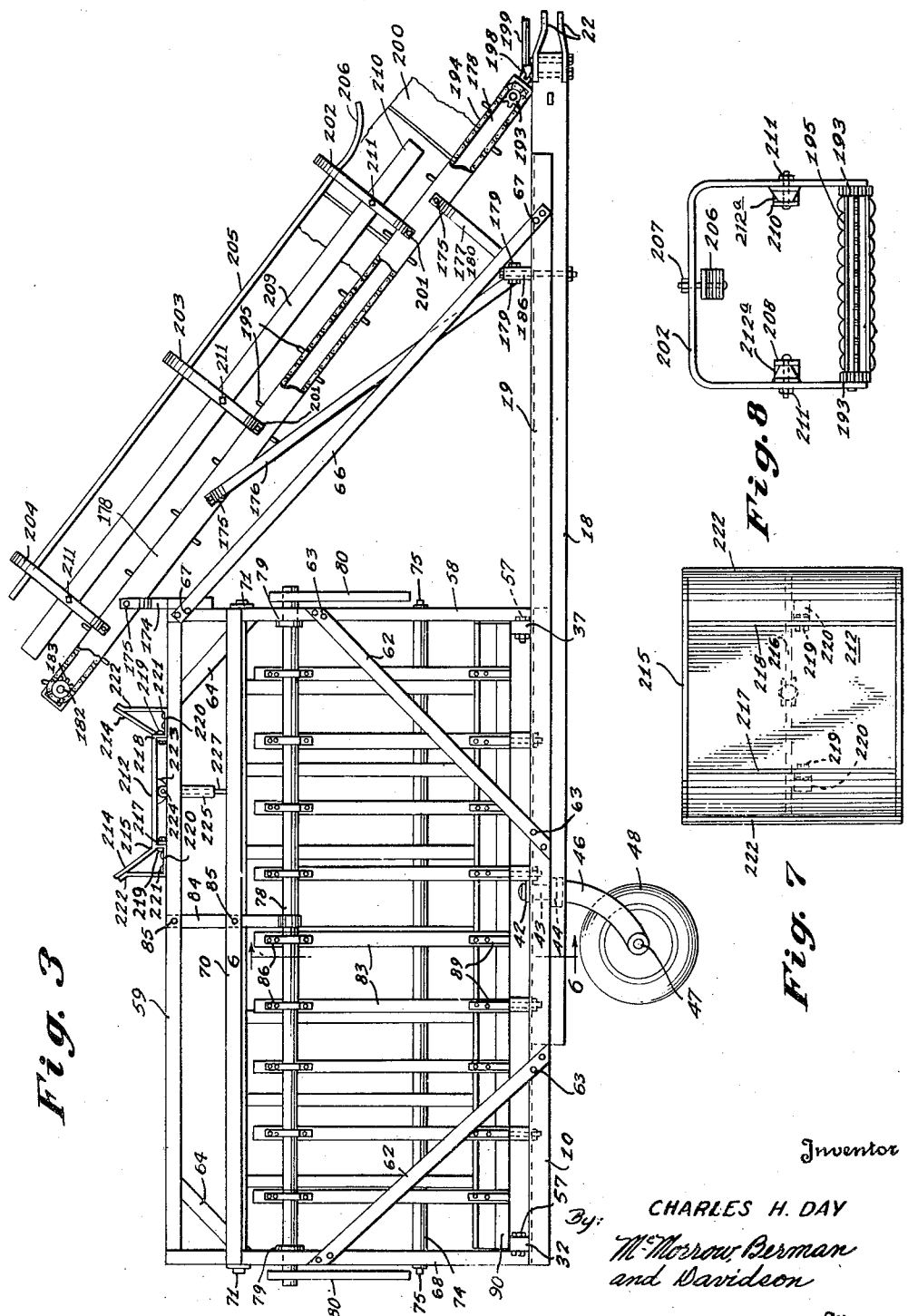
Inventor
CHARLES H. DAY
By: McMorrow, Berman and Davidson
Attorney Patented Aug. 5, 1952

2,605,915

UNITED STATES PATENT OFFICE 2,605,915

TRAILER TRUCK FOR HAY AND STRAW BALERS

Charles H. Day, Paris, Ky.; Charles H. Day, Jr., administrator of said Charles H. Day, deceased Application August 5, 1947, Serial No. 766,258

2 Claims. (Cl. 214—82)

This invention relates to a trailer truck for receiving, storing and hauling bales of hay or straw as the latter are delivered from the baling machine.

At the present time hay and straw may be baled by stationary baling machines to which the hay and straw are hauled in bulk and from which the bales are hauled away. This however is a labor consuming method of operating and is used only on small farms or in hilly country. On larger farms and in level country a combined mowing machine and baler is pulled through the field and the bales are dropped out of the baling machine on the ground. The bales are then picked up by a wagon or a truck which of course must cover substantially the same ground as the baling machine. This latter method of collecting the bales is also somewhat of a labor consuming operation. It is also known to pull a trailer truck along after the baler and to load the bales into the truck as they leave the baler but even this form of bale collecting requires the use of several men.

The principal object of the present invention is to provide a trailer truck for use with hay and straw balers which will receive the bales from the baler, store same, and from which the bales can be dropped all at once at any time in a central location.

It is another object of the present invention to provide a trailer truck which, while primarily designed for use with moving balers, may also be used with a stationary baler to provide a storage bin during the times when no truck or wagon is in the vicinity of the baler.

It is an additional object of the present invention to provide a trailer truck for hay balers having a conveyor for delivering the bales from the baler into the truck body.

It is a further object of the present invention to provide a trailer truck for a hay baler having a conveyor for delivering the bales from the baler onto a shiftable platform co-operating with the conveyor to deposit the bales from the conveyor either into the body of the truck or onto an adjacent truck or wagon.

It is still another object of the present invention to provide a trailer truck for a hay baler having a dumping means whereby, when the truck body has been filled, all of the bales may be dumped in a central location.

Still other objects, advantages and improvements will become apparent from the following specification, taken in connection with accompanying drawings, in which:

Figure 3 is a side elevation view of the trailer truck on the opposite side from Figure 2.

Figure 6 is a fragmentary sectional view taken on the line 6—6 of Figure 3, the full lines indicating the normal position of the hinged upper floor and the dotted lines indicating the position of the upper floor when in inclined or dumping position.

Figure 7 is a top plan view of the pivoted dumping platform.

Figure 8 is an end elevation view of the loading conveyor.

Figure 1:
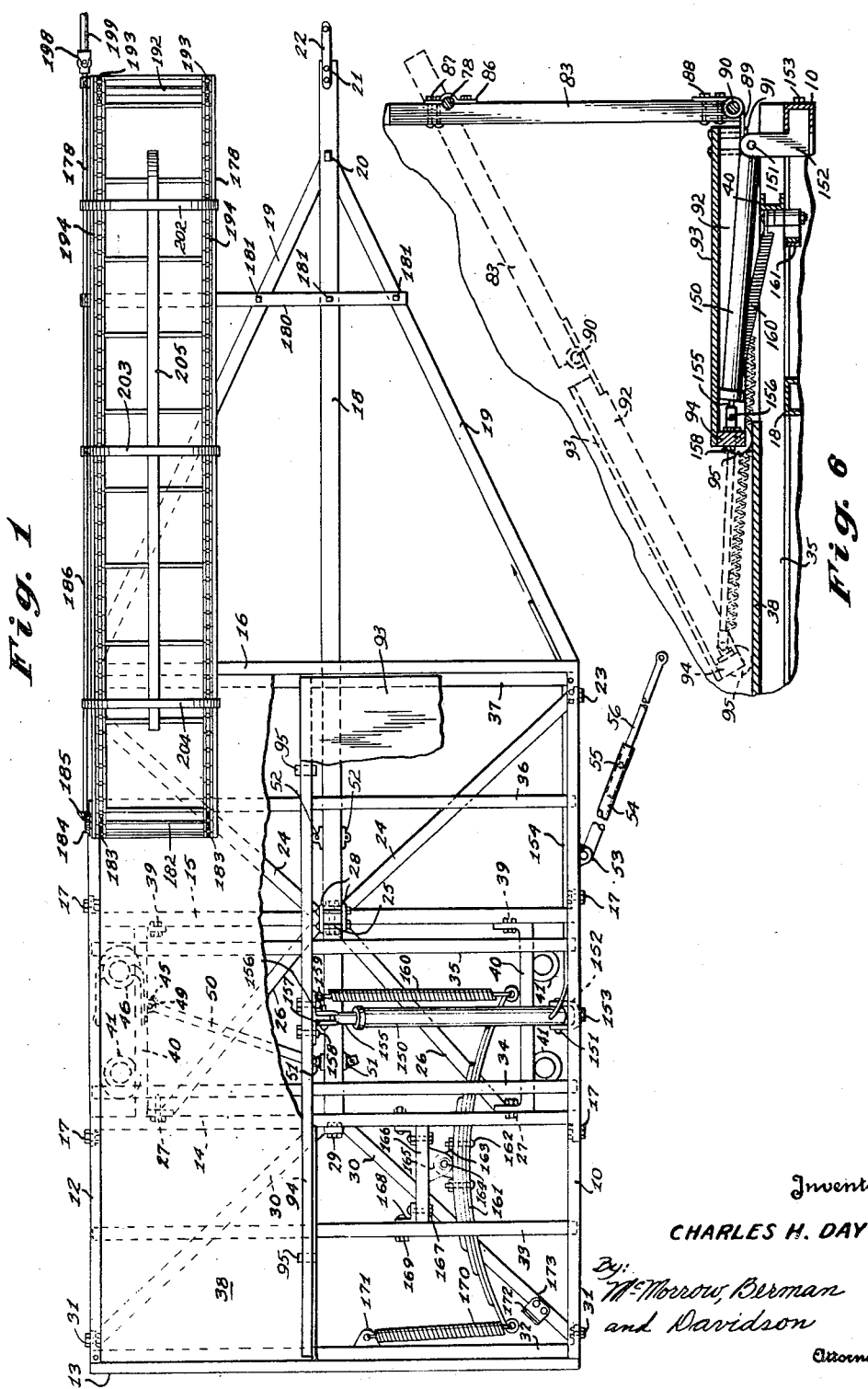
Figure 1 is a top plan view of the trailer truck according to the present invention showing in particular the conveyor and the associated dumping mechanism, with parts broken away and the platform omitted.

Referring now to the drawings in detail, and to Figure 1 in particular, the frame of the trailer truck is here shown as being comprised by two parallel longitudinal side bars of channel iron 10 and 12, and four transverse bars, also of channel iron, 13, 14, 15 and 16, the latter being spaced apart longitudinally. All of the channel irons are positioned with their webs vertically and are secured together at their respective junctures by either welding or suitable bolts (not shown). Bolts 17 are shown securing the middle transverse channel irons 14 and 15 at either end to the longitudinal channel irons 10 and 12. A tongue 18 is positioned centrally of the frame and extends forwardly thereof. Two angularly positioned side braces 19, 19 extend from the junctures of the longitudinal channel iron 10 and the transverse channel iron 16 and the longitudinal channel iron 12 and the transverse channel iron 16 forwardly and are connected to the tongue 18 by a bolt or pin 20. At its forward end the tongue 18 is provided with a clevis 22 secured thereto by bolts 21 for attachment of the trailer truck to the baling machine.

Forward angle braces 24, 24 are secured to the side bars 10 and 12 adjacent the front ends of the latter by bolts 23 and to the transverse bar 15 at the mid-section of the latter by bolts 25;

similarly, middle angle bars 26, 26 are secured to the transverse bar 14, inwardly of the ends of the latter, by bolts 27 and to the transverse bar 15, also at the mid-section of the latter, by the bolts 25. The tongue 18 is secured to the angle braces 24, 24 and 26, 26, and to the transverse bar 15, by suitable attachment means, such as U-straps 28. Rear angle bars 30, 30 are secured to the transverse bar 14 at its mid-section by bolts 29 and to the side bars 10 and 12 adjacent their rear ends by bolts 31. The tongue 18 terminates in an up-turned flange at the mid-section of the transverse bar 14 and is also secured to this bar and to the angle bars 30, 30 by the bolts 29.

Six longitudinally spaced sills, preferably of wood, 32, 33, 34, 35, 36, and 37, are secured to the longitudinal side bars 10 and 12, the end sills 32 and 37 abutting the transverse cross bars 13 and 16, respectively. Over the left side (Figure 1) of the bottom frame comprised by the transverse bars 13, 14, 15, and 16, the angle braces 24, 26, and 30, the sills 32, 33, 34, 35, 36, and 37, there is placed a fixed sheet metal floor 38 which extends from the side channel bar 12 for approximately half of the width of the frame.

Two longitudinally disposed channel bars 40, 40 are positioned intermediate the transverse channel bars 14 and 15 and parallel to the side bars 10 and 12. These longitudinal channel bars are secured to the transverse bar 14 by the bolts 27 and to the transverse bar 15 by other bolts 39. A pair of bearing bosses 41, 41 is secured to each of the longitudinal channel bars 40, 40 as by suitable bolts (not shown) or by welding.

The rolling support for the trailer truck is comprised by a pair of crazy wheels 48, 48 having pneumatic tires thereon, and each positioned on an axle 47 carried by a yoke 46. Each yoke 46 has an integral bearing collar 44 thereon and a cylindrical hub 43 above the collar. The hubs 43, 43 are rotatably received within the bearing bosses 41, 41 on the longitudinal channel bars 40, 40 and are secured therein by having collars 42 force fitted or held thereon by suitable cotter keys (not shown). Two bearing bosses 41, 41 are mounted on each longitudinal channel bar 40 so as to provide for positioning the crazy wheels 48, 48 either forwardly or rearwardly of the trailer truck body according to the anticipated center of gravity of the load.

The crazy wheels 48, 48 are rotatably mounted so that the trailer truck may follow the hay baler in the course of irregular movement through the field. However for drawing the trailer truck along a straightaway path through the field, it may be desirable to eliminate the pivotal action of the crazy wheels 48, 48. The latter will also be the case when the trailer truck is being drawn along the road to and from the field. In order to eliminate such action, constraining rods 50, 50 are provided. The yoke 46 of each crazy wheel is provided with an apertured lug 45, suitably welded thereto. The rods 50, 50 are pivotally mounted by brackets 51, 51 on either side of the tongue 18 and each rod has a pin 49 on its outer end adapted to fit in the corresponding apertured lug 45 on the yoke 46. With the rods 50, 50 in such position the crazy wheels 48, 48 are fixed against pivotal movement and they act in the manner of the wheels on a fixed axle vehicle. When the rods 50, 50 are not being used and the crazy wheels 48, 48 are allowed to pivot freely, the rods are swung forwardly and the pins 49 on their outer ends are secured in suitable apertured lugs 52, 52 mounted on the tongue 18 forwardly of the pivotal brackets 51, 51.

When drawing the trailer truck through an irregularly shaped field, it may be desirable to eliminate swinging movement of the trailer body with respect to the baler, in order to maintain the conveyor or elevator, to be later described, in alignment with the baling chamber of the baler. For this purpose a rigid connection between the two may be used. A tube 54 is pivotally secured to a bracket 53 on the side frame member 10 and this tube slidably receives a rod 56 which is adjustably secured therein by a bolt 55. The forward end of the rod 56 may be attached to the baler to form a rigid brace between the baler and the trailer truck body.

Figure 2:
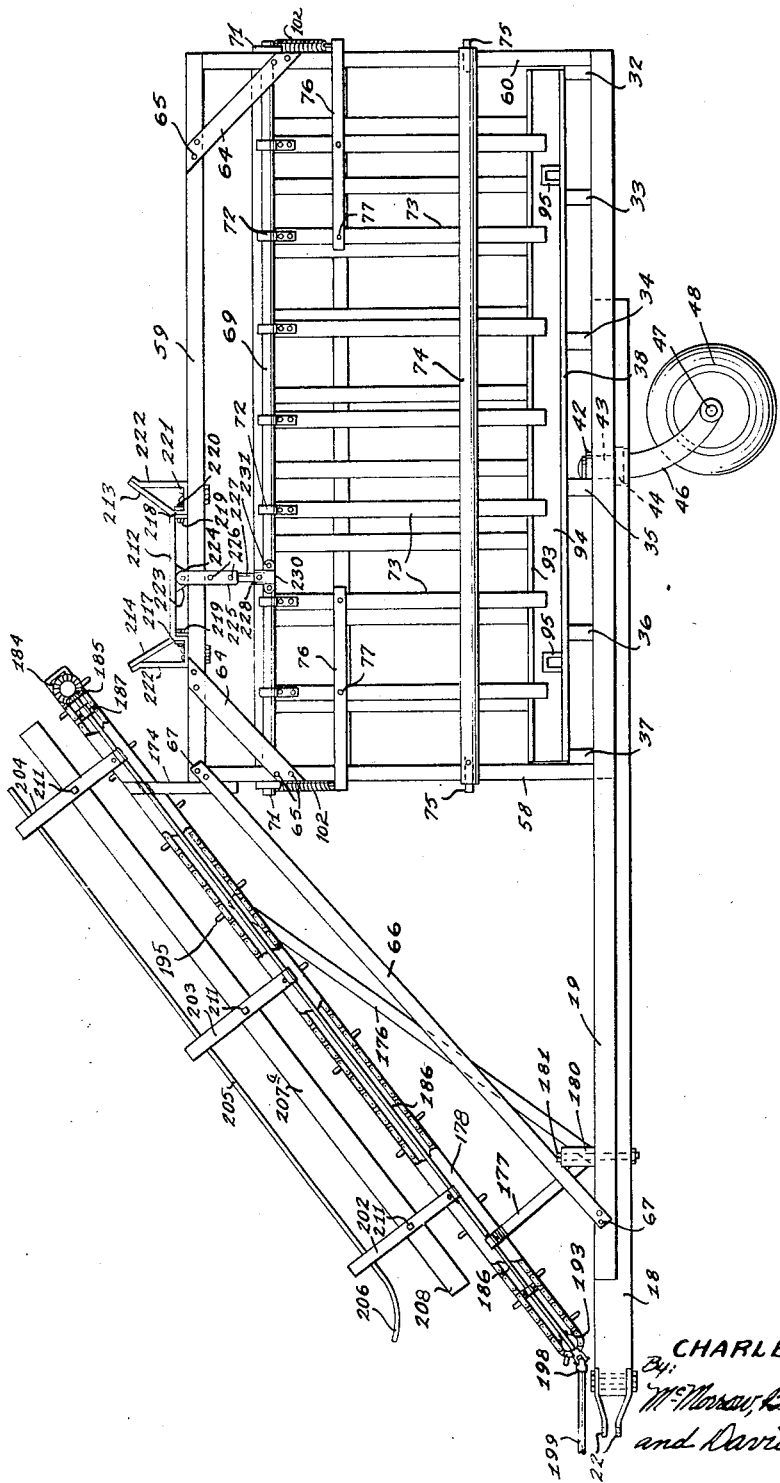
Figure 2 is a side elevation view of the trailer truck showing in particular the swivelled rear wheels and the pivoted side standards of the automatic dumping mechanism.

Referring now to Figure 2, there is here shown the pivoted side gate through which the bales are dumped from the trailer truck body. The frame on each side is comprised by front and rear corner uprights 58 and 60. The uprights 58 and 60 are secured to the front and rear sills 37 and 32, respectively, as by bolts 57. Longitudinal top bars 59 are positioned on each side of the trailer truck body across the tops of the uprights 58 and 60 and secured thereto, also by suitable bolts (not shown). Corner braces 64, 64 are secured across the angles between the top bars 59 and the uprights 58 and 60, respectively, and held to the top bar and the uprights by bolts 65. On each side of the trailer truck body a front brace 66 extends from the juncture of the front upright 58 and the top bar 59 to the corresponding side brace 19 adjacent the forward end of the latter and is secured in place by bolts 67 at either end. Parallel to the top bar 59 and spaced downwardly from the latter there is mounted a journal bar 69 which is secured in the uprights 58 and 60 by bearing collars 71, 71. A plurality of longitudinally spaced and vertically positioned bars 73 are pivotally suspended from the journal bar 69 by bearing straps 72. Adjacent the lower ends of the bars 73 a longitudinally positioned bar 74 is secured to the latter, as by bolts (not shown), and unites these bars into a first gate. At the outer ends of the longitudinal bar 74 there are mounted axially positioned pins 75, 75 for cooperation with a latch mechanism to be later described.

Adjacent their upper ends, the outermost pairs of bars 73 have attached thereto short longitudinal bars 76, 76 by bolts 77. These longitudinal bars 76, 76 have biasing springs attached to their outer ends, as will be later described. In addition, these latter bars abut the corner uprights 58 and 60, respectively, to function as stops and prevent inward swinging movement of the gate structure past the vertical dead center position.

Referring now to Figure 3, the opposite side of the trailer truck body is here shown, this structure embodying a second gate and operating as an ejector to expel the bales through the pivoted gate 73 on the side previously described. Below and parallel to the top bar 59 there is mounted a longitudinal bar 70, also secured to the corner uprights on this side by bolts (not shown). Likewise below and parallel to the longitudinal bar 70 there is mounted a rock shaft 78 which is journaled in the corner uprights 58 and 60 by bearing collars 79, 79. The rock shaft 78 is provided with arms 80, 80 on either end for cooperation with the latch mechanism, to be later described. A hanger strap 84 is secured to the bars 59 and 70 by bolts 85 and receives and rotatably supports the rock shaft 78.

A plurality of spaced and vertically positioned bars 83 are secured to the rock shaft 78 for oscillation therewith by straps 86 secured to the bars by bolts 87. Across the angles between the longitudinal side bar 10 and the uprights 58 and 60, corner braces 62, 62 are secured by bolts 63. These corner braces also serve as stops to limit outward swinging movement of the bars 83 past the vertical dead center position.

Referring now to Figure 6, the second floor or pivoted half-floor, which also functions as part of the bale ejector structure, is here shown. As previously stated, the left side (Figure 1) of the bottom frame is covered with a fixed floor 38 supported on the sills 32, 33, 34, 35, 36, and 37. Over the right side there is positioned a pivoted sheet metal half-floor 93. This floor 93 is mounted on a plurality of half-sills 92 which are vertically aligned with the sills 32, 33, 34, 35, 36, and 37, and to the inner ends of these half-sills there is secured a longitudinally positioned bar 94 (Figure 1). On the bar 94 there are mounted two or more rollers 95 adapted to run over the fixed half-floor 38. The vertical bars 83 are notched at their lower right corners and in the aligned notches there is mounted a pivot tube or rod 90. Angle straps 89 partially encircle the pivot tube 90 and are secured to the vertical bars 83 by bolts 88 and to the half-sills 92 by other bolts 91.

Figure 4:
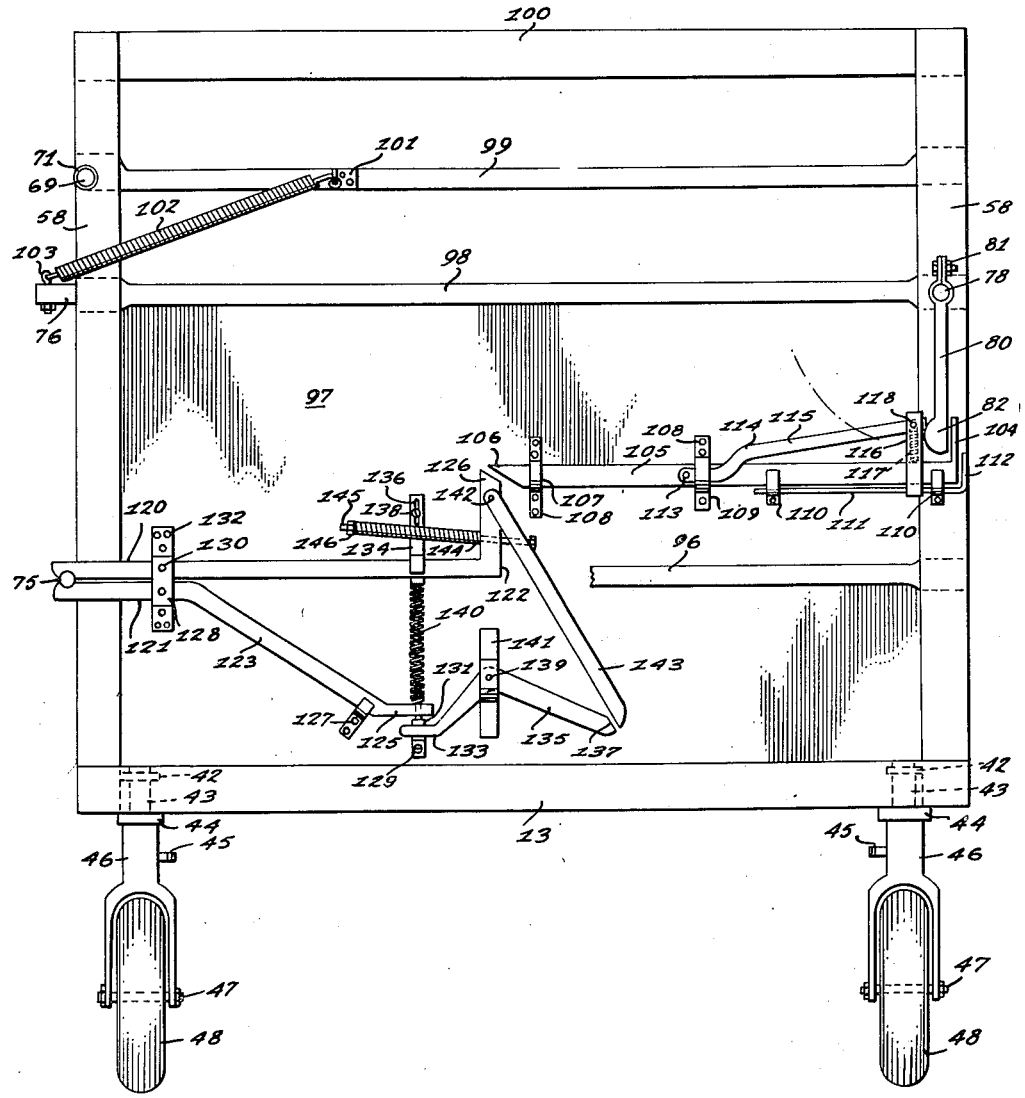
Figure 4 is a rear elevation view of the trailer truck showing in particular the side gate latching mechanism.

Referring now to Figure 4, there is here shown the front and rear end frames of the trailer truck body (these being identical), and the latch mechanism for the side gate 73. Transverse bars 96, 98, 99, and 100 are secured to the corner uprights 58, 59 (and 60, 60) at variably spaced vertical intervals, as by bolts (not shown). The space between the bottom transverse bar 13 and the middle transverse bar 98 is covered by a sheet metal panel 97.

Tension springs 102, 102 are secured intermediate lugs 101 on the transverse bar 99 and eyebolts 103 in the ends of the longitudinal bars 76, 76 on the side gate 73. These springs serve to return the gate 73 to the vertical position in which position it is held by the transverse bars 76, 76 abutting the corner uprights 58 and 60.

The arms 80 have integral semi-cylindrical straps at their upper ends, which receive the rock shaft 78, and bifurcated ends through which bolts 81 extend to secure the arms to the rock shaft. The lower ends of these arms are formed as integral cam surfaces 82. Latch bolts 105 are slidably secured on the end panels 97 by strap eyes 107 and 109 attached to the panels by bolts 108. These latch bolts have upright abutments 104 on their outer ends and cam surfaces 106 on their inner ends. The latch bolts are additionally slidably supported by open top straps 110 which latter also mount a stop bar 111 having an upright abutment 112 on its outer end which functions as a stop to limit outward movement of the upright abutment 104 on the latch bolt 105. An operating bar 115 is pivotally secured at 113 to each latch bolt 105 just inside the strap 109, each operating bar having a curved section 114 therein, and having its outer end extending through a U-strap 116 which is secured thereto by a bolt or rivet 118 and which straddles the latch bolt 105. A compression spring 117 is positioned intermediate the latch bolt 105 and the operating bar 115 and biases the latter upwardly against the top of the strap 116.

Pairs of latch levers 120 and 121 are pivotally mounted on each of the end panels 97, 97 and grip the pins 75, 75 on the transverse gate bar 74 in pincers fashion. These levers are pivoted at 130 on a strap 128 secured to the respective end panel 97 by bolts 132. The uppermost latch lever 120 has an upturned arm 122 on its inner end with a cam surface 126 thereon adapted to cooperate with the cam surface 106 on the latch bolt 105. An open bottom strap 134 is adjustably secured to the panel 97 by a bolt 136 extending through an elongated slot 138 in the strap and this strap serves to limit swinging movement of the latch lever 120 to the horizontal position.

The latch lever 121 has a downturned mid-section 123 which latter terminates in a lower horizontal end 125. The downturned mid-section 123 of the latch lever 121 is received in an open top strap 127 which limits downward oscillation of the latch lever. A compression spring 140 is positioned intermediate the latch lever, in alignment with the open bottom strap 134, and the lower horizontal end 125 of the latch lever 121, this spring being adjustably secured to the end 125 by a bolt 131. A bell crank lever 135 is pivoted at its mid-section at 139 on a strap 141 which is secured by bolts (not shown) to the end panel 97. One arm 133 of the bell crank lever is positioned intermediate the head of the bolt 131 and an adjacent stop lug 124 on the end panel 97 and the other end is formed with an abutment surface 137. An operating link 143 is pivotally mounted at 142 on the upturned arm 122 of the latch lever 120 and at its lower end is in close juxtaposition to the abutment surface 137 on the bell crank lever 135. A compression spring 144 surrounds an elongated bolt 145 which at one end extends freely through suitable aligned holes in the operating link 143 and the upturned arm 122 on the latch lever 120 and has a nut 146 thereon.

The operation of the latch mechanism is as follows:

Oscillation of the rock shaft 78 in the clockwise direction (Figure 4) will cause the arm 80 to pick up with its lower cam surface 82 the operating bar 115 and drive latch bolt 105 inwardly. Cam surface 106 on the latch bolt 105 moves over cam surface 126 on the upper latch lever 120 swinging the latter downwardly, partially freeing the pin 75 and compressing the spring 140. Downward oscillation of the latch lever 120 causes the operating link 143 to come into engagement with the abutment surface 137 on bell crank lever 135 and oscillates the latter in the clockwise direction. During such clockwise oscillation of the bell crank lever 135 the inner end 133 of same imparts additional compression to the spring 140 at its lower end and also pushes upwardly the bolt 131 in the lower horizontal end 125 of the latch lever 121, oscillating the latter in the counterclockwise direction and fully freeing the pin 75.

As the latch bolt 105 is moved inwardly, the operating bar 115 is swung downwardly due to the curved section 114 therein passing into the strap 109 and the cam surface 82 on the arm 80 passes free of the end of the operating bar 115 and upwardly out of the strap 116 to complete its full ninety degrees of oscillation. During such oscillation of the arm 82, the curved section 114 in the operating bar 115 strikes strap 109 and the outer end of the operating bar 115 carries the strap 116 downwardly free of the cam end 82 of the arm 80 and compresses the spring 117. This mechanism serves as a friction brake to hold the latch bolt 105 against return movement under action of the compression springs 140 and 144, operating on the latch lever 120 and the operating link 143, respectively, while the arm 80 completes its forward and part of the return oscillation. Return movement of the latch bolt 105 is accomplished during reverse oscillation of the arm 80 by the arm striking the upturned abutment 104 on the latch bolt 105 and this movement is stopped when said abutment strikes the upturned fixed abutment 112 on the stop bar 111. The latch levers 120 and 121 are returned to their pin engaging positions by the compression springs 140 and 144. In this connection it will be noted that the lever arm of the tension springs 102, 102 increases as the gate 73 swings downwardly and that it approaches a maximum as the pins 75, 75 enter the still open jaws of the latch levers 120, 121.

Since the latch mechanism above described is duplicated on the front and rear end panels 97, the entire trailer truck body may be turned through one hundred and eighty degrees on the frame so as to discharge the bales on the right or left side of the body as may be desired.

Referring now to Figure 1, there is here shown a servo-motor mechanism for operating the gate 73, the second gate 83, including the half-floor 93, and the latch mechanism as previously described. A hydraulic cylinder 150 is pivotally mounted at one end by trunnions 151, 151 in a U-shaped bracket 152 which is secured to the longitudinal side bar 10 by suitable bolts 153. A fluid pressure conduit extends from the cylinder 150 along the longitudinal side bar 10 and the corresponding side brace 19 to the "lift-all" on the tractor (not shown) which drives the baler. A piston rod 155 is reciprocally mounted within the cylinder 150 and is connected at its outer end by a bolt or pin 156 to a bracket 157 which is secured by bolts 158 to the longitudinal bar 94 of the pivoted half-floor 93.

A coiled tension spring 160 is connected at one end in an eye 159 on the bracket 157 and at its opposite end to one end of a half-elliptical spring 161. At its center the half-elliptical spring 161 has a shackle 163 secured thereto by bolts 162. The shackle 163 is pivotally connected by a bolt 164 to a bracket 165 on a cross brace 166 which latter is secured between the sill 33 and the transverse bar 14 by angle brackets 168, 168.

Bolts 167 secure the angle brackets 168, 168 to the cross brace 166 and other bolts 169 secure same to the sill 33 and the transverse bar 14, respectively. The opposite end of the half-elliptical spring 161 is secured to one end of a second coiled tension spring 170 which in turn is secured at its opposite end to a lug 171 on the sill 32. A stop plate 172 is mounted on the adjacent angle bar 30 by bolts or rivets 173 and serves to limit elongation of the tension spring 170 and outward flexure of the rear arm of the half-elliptical spring 161. The tension of the spring 170 counteracts that of the spring 160 leaving the half-elliptical spring 161 to perform the function of restoring the longitudinal bar 94 of the pivoted half-floor to normal position after the hydraulic cylinder 150 has ceased to operate.

Referring now to Figures 1, 2, and 3, there is here shown the conveyor or elevator for receiving the bales from the chamber of the baling machine and carrying them to the top of the trailer truck body. The conveyor frame is comprised by two parallel side members 178, 178 which are mounted adjacent their upper ends on bars 174 secured to one of the corner uprights 58 and the top transverse bar 100, at approximately their mid-sections by braces 176, and adjacent their lower ends by additional braces 177.

The bars 174 and the braces 176 and 177 are secured to the side frame members by bolts 175 and at their lower ends to a cross beam 180 by bolts 179. The cross beam 180 is secured across the tongue 18 and the side braces 19, 19 adjacent the mutual juncture of the latter and is attached to these members by bolts 181.

Adjacent their upper ends the side frame members 178, 178 mount a shaft 182 having sprocket wheels 183, 183 adjacent its opposite ends and a bevel gear 184 on its outer end. Similarly, adjacent their lower ends the side frame members 178, 178 mount a second shaft 192 having sprocket wheels 193, 193 adjacent its opposite ends. A longitudinal shaft 186 is positioned along the outer side frame member 178 and journaled thereon by suitable bearings 187 and has a bevel gear 185 at its upper end meshing with the bevel gear 184 on the shaft 182. A driving shaft 199 extends from the tractor, or from a suitable connection on the baling machine, and has a universal joint 198 therein through which it is connected to the shaft 186. Parallel continuous chains 194 are trained over the upper and lower sprockets 183, 183 and 193, 193 and cleats 195 are secured transversely of these chains and form bale engaging projections. It will be apparent that the longitudinal shaft 186 transmits torque from the driving shaft 199 to the upper cross shaft 182.

A plurality, three being shown, of U-shaped channel bars 202, 203, 204 are mounted over the top of the side frame members 178, 178 and secured to the latter by bolts 201. A top guide board 205 has an upturned curved lower end 206 and is secured centrally of the U-shaped channel irons 202, 203 and 204 by hanger bolts 207. Similarly, opposed side guide boards 207a and 209 have outwardly curved ends 208 and 210, respectively, and are secured to the sides of the U-shaped channel irons 202, 203, 204 about the mid-sections of the latter by bolts 211. Spacer blocks 212a are mounted between the guide boards 207a and 209 and the sides of the U-shaped channel 202, 203, 204 so that the bales 200 in the act of moving up the conveyor will not strike the channel irons.

Referring now to Figures 2, 3, and 7, the platform for receiving the bales from the conveyor previously described is here shown. This platform consists of a bottom 212 having upwardly and outwardly inclined side walls 214, 214 arranged in trough like construction. At the ends of the bottom 212, as well as at the ends of the side walls 214, 214, there are mounted reinforcing angle irons 215. Longitudinally of the bottom there are mounted adjacent the junctures of the bottom and the side walls 214, 214 angle irons 217 and 218. Adjacent the center of the platform 212 the angle irons 217, 218 are pivotally mounted by bolts 219 on angle brackets 220, 220, which in turn are mounted on the longitudinal top bar 59 by bolts 221. Side braces 222, 222 extend upwardly from the angle brackets 220, 220 and abut the side walls 214, 214 adjacent the upper edges of the latter. Spaced apart and lengthwise of the platform from the pivots or bolts 219, 219 there is mounted on the bottom 212 of the platform a middle transverse angle iron 216, the platform being mounted on the trailer truck body with this angle iron in registry with the journal bar 69. For shifting the angle of the platform, a telescopic joint is provided. At the center of the angle iron 216 there is secured, as by welding, a lug 223. Attached to the lug 223, as by a pin 224, there is the tube section 225 of the telescopic joint. The rod section 227 of this joint is received within the tube section 225 and secured in one of several selected positions by a diametrically extending pin 226. The lower end of the rod section 227 is secured by a pin 229 in a socket 230 which in turn is secured to the journal bar 69 by bolts 231.

The operation of the trailer truck has been previously described as regards the constraining rods 50, 50, the steadying brace 54, and the latch mechanism 105, 120, 121. As before stated, the trailer truck is primarily intended for use with a baling machine being towed by a tractor through the field. The bales 200 are received from the chamber of the baling machine and are carried by the cleats 195 on the conveyor chains 194, 194 up the conveyor. From the conveyor, the bales are dumped onto the platform 212. If wagons or trucks are available in a continuous stream, the platform 212 is set by the telescopic joint 225, 227 to guide the bales into the wagons or trucks, the latter being driven alongside the trailer truck while being loaded.

If, however, such wagons or trucks are not available, the platform 212 may be inclined in the opposite direction by adjusting the telescopic joint 225, 227 so as to dump the bales into the trailer truck body. The latter will in time of course become filled.

To empty the trailer truck body, a suitable control valve (not shown) on the "lift-all" unit of the tractor drawing the baling machine may be operated to activate the hydraulic cylinder 150. The piston rod 155 will now be expelled from the cylinder and will move the longitudinal bar 94 of the pivoted half-floor 93 over the fixed floor 38.

Figure 5:
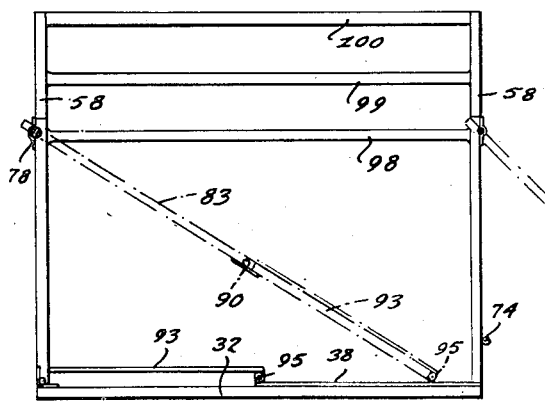
Figure 5 is a transverse outline view showing the pivoted side gate swung outwardly and the hinged floor in the inclined dumping position.

The vertical bars 83 on the right side (Figures 3 and 4) of the trailer truck body, being pivoted at 90 to the half-sills 92 of the pivoted half-floor, will be swung inwardly and approximately aligned with the half-floor, as shown in Figure 5. Also, these bars being secured to the rock shaft 78, the latter will be correspondingly oscillated and will simultaneously operate the latch mechanism, as previously described. The pins 75, 75 on the longitudinal bar 74 of the side gate 73 are released and this gate is now swung outwardly under action of the bales pressing on same, allowing the bales to be dumped on the ground. Upon de-energization of the hydraulic cylinder 150, this sequence of operations is repeated in reverse order, the tension springs 102, 102 returning the gate 73 to vertical dead center position and the half-elliptical spring 161 returning the longitudinal bar 94 of the half-floor 93 to its normal position approximately central of the bottom frame structure, the half-floor 93 itself to the horizontal position, and the side bars 83 to their initial vertical positions.

The dumping of the bales at one central location on the ground has the obvious advantage that the trucks or wagons can be driven to such central location to pick up all of the bales there instead of covering substantially the same route as the baling machine and the trailer truck to pick up scattered bales. Moreover, when no truck or wagon is available, the bales, being collected together, can be covered with a tarpaulin over night.

In stationary baling, which is sometimes used when baling hay and always used when baling straw, the operation of the trailer truck is the same with the exception that the bales will always be dumped out of the gate 73 in the same location.

It will be apparent that, while the above description and the annexed drawing set forth is a preferred embodiment of the present invention, various changes may be made in the sizes, shapes, proportions, and relative arrangements of the different parts without departing from the spirit of the invention as defined by the appended claims.

Having now described my invention, what I claim as new and useful and desire to secure by Letters Patent is:

1. In a trailer truck, a body including a bottom frame, a pair of upstanding side frames arranged in parallel spaced relation and carried by said bottom frame, and an upstanding end frame extending between said side frames adjacent each end of the latter and secured to said side frames and said bottom frame, a floor fixedly positioned upon and extending longitudinally of said bottom frame and having one side edge contiguous to one of said side frames and having the other side edge inwardly of and spaced from the other of said side frames, a first vertically disposed gate positioned contiguous to said one of said side frames and having the upper end connected to the last named side frame for swinging movement from the vertical position to a position at an angle with respect to and outwardly of said one of said side frames, a second floor disposed to one side of and extending longitudinally of said first floor and having one side edge contiguous to the other of said side frames and having the other side edge overlying the other side edge of said first floor, said second floor being supported on said first floor for sliding movement toward and away from said first floor, a second vertically disposed gate positioned contiguous to said other of said side frames and having the upper end connected to the last named side frame for swinging movement from the vertical position to a position at an angle with respect to and inwardly of said other of said side frames and having the lower end pivotally connected to said other side edge of said second floor, latch mechanism for said first gate carried by said end frames and operatively connecting said first and second gates for unlatching said first gate upon movement of said second gate, hydraulic means operatively connected to said second floor for effecting the sliding movement of said second floor over said first floor, and spring means operatively connected to said hydraulic means and said second floor for effecting the sliding movement of said second floor away from said first floor.

2. In a trailer truck, a body including a bottom frame, a pair of upstanding side frames arranged in parallel spaced relation and carried by said bottom frame, and an upstanding end frame extending between said side frames adjacent each end of the latter and secured to said side frames and said bottom frame, a floor fixedly positioned upon and extending longitudinally of said bottom frame and having one side edge contiguous to one of said side frames and having the other side edge inwardly of and spaced from the other of said side frames, a first vertically disposed gate positioned contiguous to said one of said side frames and having the other end connected to the last named side frame for swinging movement from the vertical position to a position at an angle with respect to and outwardly of said one of said side frames, a second floor disposed to one side of and extending longitudinally of said first floor and having one side edge contiguous to the other of said side frames and having the other side edge overlying the other side edge of said first floor, said second floor being supported on said first floor for sliding movement toward and away from said first floor, a second vertcally disposed gate positioned contiguous to said other of said side frames and having the upper end connected to the last named side frame for swinging movement from the vertical position to a position at an angle with respect to and inwardly of said other of said side frames and having the lower end pivotally connected to said other side edge of said second floor, latch mechanism for said first gate carried by said end frames and operatively connecting said first and second gates for unlatching said first gate on movement of said second gate, hydraulic means operatively connected to said second floor for effecting the sliding movement of said second floor over said first floor, spring means operatively connected to said hydraulic means and said second floor for effecting the sliding movement of said second floor away from said first floor, and another spring means operatively connected to said first gate for urging the latter toward its vertical position.

CHARLES H. DAY.

REFERENCES CITED

The following references are of record in the file of this patent:

UNITED STATES PATENTS

| Number | Name | Date |
|---|---|---|
| 957,483 | Alley | May 10, 1910 |
| 1,010,910 | Hilborn | Dec. 5, 1911 |
| 1,368,931 | Hokanson | Feb. 15, 1921 |
| 1,373,628 | Nelson | Apr. 5, 1921 |
| 1,392,419 | Jones | Oct. 4, 1921 |
| 1,395,028 | Berg et al. | Oct. 25, 1921 |
| 1,529,483 | Hanson | Mar. 10, 1925 |
| 1,587,612 | Staley | June 8, 1926 |
| 1,654,032 | Avery | Dec. 27, 1927 |
| 1,780,299 | Jackson | Nov. 4, 1930 |
| 1,812,539 | Ludowici | June 30, 1931 |
| 1,897,175 | Meyer | Feb. 14, 1933 |
| 1,921,291 | Hanson | Aug. 8, 1933 |
| 1,958,494 | Pehrsson | May 15, 1934 |
| 2,023,330 | Linn | Dec. 3, 1935 |
| 2,072,998 | Allin | Mar. 9, 1937 |
| 2,121,922 | Nampa | June 28, 1938 |
| 2,284,661 | Joy | June 2, 1942 |
| 2,471,874 | Johns | May 31, 1949 |

FOREIGN PATENTS

| Number | Country | Date |
|---|---|---|
| 93,556 | Austria | July 10, 1923 |
| 495,963 | Germany | Apr. 15, 1930 |
| 578,572 | Germany | June 15, 1933 |